Oct. 13, 1970 KOOSUKE HARADA 3,534,342
PULSE RESET MAGNETIC NON-DESTRUCTIVE ANALOG MEMORY
Filed Dec. 28, 1967 2 Sheets-Sheet 1

INVENTOR.
KOOSUKE HARADA
BY David E. Hoppe
ATTORNEY

INVENTOR.
KOOSUKE HARADA
BY David E. Hoppe
ATTORNEY

United States Patent Office 3,534,342
Patented Oct. 13, 1970

3,534,342

PULSE RESET MAGNETIC NON-DESTRUCTIVE ANALOG MEMORY

Koosuke Harada, Fukuoka-shi, Japan, assignor to The Ohio State University Research Foundation, Columbus, Ohio Filed Dec. 28, 1967, Ser. No. 694,136
Int. Cl. G11c *11/06*
U.S. Cl. 340—174 14 Claims

ABSTRACT OF THE DISCLOSURE

A double-core analog memory circuit may be reset to a reference level by a pulse applied so as to saturate both cores in a pre-selected direction; the output windings are connected to yield a resultant zero output; to achieve a more perfect saturation balance between the cores, a bi-polar reset pulse is employed; in the double-core circuits, the input signal polarity determines which core memorizes, with the output being phase sensitive to said polarity; a linear inductor may be used alternatively to the reference core for an analog subtracting function with a bi-polar input signal having a preselected predominant polarity; the reset reference achieved by this method is compatible with a fundamental output wherein the minor loop spans the residual flux levels in the memorizing core from a saturated condition to the de-magnetized condition, or with an even harmonic output wherein the minor loop spans the residual flux levels in the memorizing core from one saturation condition to the other.

Briefly stated, the invention provides an improved pulse reset method for a pair of analog memory magnetic cores wherein the applied pulse drives both cores to saturation, this saturation condition representing the zero reference level. Alternatively, the reset pulse saturates a non-linear magnetic core with a linear inductor employed to balance the saturated condition to produce a resulting reset condition. This pulse reset method eliminated inaccuracies and errors inherent in other forms of analog reset methods.

These and other advantages of the invention will be in part apparent from the specification below and in part from the claims taken in conjunction with the drawings in which;

The magnetic behavior of a magnetic core may be described in terms of B–H curves plotting the applied magnetizing signal against the magnetic flux of the core. The B–H curves describing the core behaviour include a major loop and a family of minor loops. The minor loops may be centered at any residual flux level between core de-magnetization and either negative or positive core saturation. It may be noted that for all minor loops except for the perfectly de-magnetized minor loop, a degree of asymmetry is exhibited therein. The asymmetry of a minor loop may be employed in an analog memory circuit having an output detecting even harmonics of the signals resulting from the A.C. excitation. These even harmonics are a function of the degree of asymmetry of the minor loops. If means are provided to displace the minor loops as a consequence of an input signal, a non-destructive analog memory circuit may be formed. These circuits are used in holding circuits of sample value systems, counter circuits, memory circuits of all descriptions and the like.

Heretofore, it has been common to reset such memory circuits with an A.C. signal adapted to de-magnetize both cores to a zero flux condition. Usually, a large A.C. signal is applied to operate the cores on their major loops, with the A.C. reset signal gradually being decreased in amplitude over a sufficiently long period of time to return the cores to minor loops centered on the zero flux level. If the reduction of the A.C. reset signal were to be too rapid, the cores would not return to minor loop centered on the zero flux condition but would be settled on some intermediate flux level position. Thus the A.C. reset methods requires appreciable time, which cannot be shortened except at the expense of reset accuracy.

Figure 1:
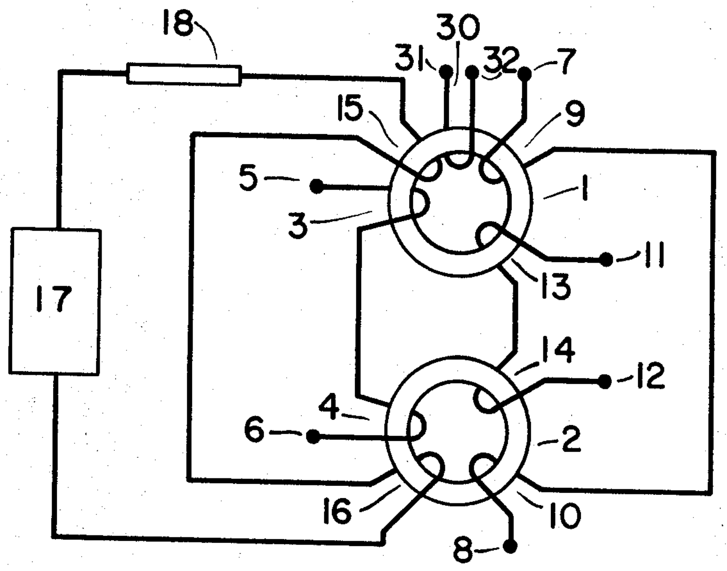
FIG. 1 is a schematic diagram of a double-core embodiment of the invention.

The embodiment of the invention illustrated in FIG. 1 is adapted to provide a pulse reset to a zero reference in an extremely short time interval. The reset reference level corresponds to condition wherein both magnetic cores are saturated. This method provides a highly stable reset reference level.

Magnetic cores 1 and 2 are both magnetic cores having similar magnetic characteristics. A.C. excitation is provided to winding 3 on core 1 and winding 4 on core 2, windings 3 and 4 being connected to the source of A.C. excitation at terminals 5 and 6, conveniently in a series aiding configuration. However, the manner of connecting windings 3 and 4 to the source of A.C. excitation is arbitrary, the requirement only being that the remaining windings are connected with proper regard for the A.C. excitation phase. For convenience, cores 1 and 2 are said to be excited in phase it follows from this designation that the A.C. excitation changes the flux levels in each core in step, and in the same direction. An input signal from terminals 7 and 8 is applied to input winding 9 on core 1 and input winding 10 on core 2; windings 9 and 10 are connected in series opposition (with respect to the in-phase orientations of cores 1 and 2 as referred to the A.C. excitation) so that an input signal alters the flux level in one core in the opposite direction from the flux change in the other. Winding 13 on core 1 and winding 14 on core 2; are connected in series opposition to output terminals 11 and 12 so that the effects of A.C. excitation from windings 3 and 4, which are designated as connected in series aiding, will cancel as appearing at output terminals 11 and 12.

The output applied to terminals 11 and 12 as a consequence of the A.C. excitation on windings 3 and 4 will be zero so long as the flux level in both cores is identical. If the flux levels differ as between cores 1 and 2, a fundamental output is applied to terminals 11 and 12 corresponding to the frequency of the A.C. excitation, the amplitude of this fundamental output being related to the difference in the displacements of the minor loops from their respective zero flux conditions; in addition, an even harmonic output will be supplied to terminals 11 and 12 corresponding to the even harmonics of the frequency of the A.C. excitation, the magnitude of which is related to the asymmetry between the respective minor loops of the two cores.

A pulse reset source 17 is applied through serial high impedance 18 to reset windings 15 and 16, connected in series aiding, that is, in the same direction as A.C. excitation windings 3 and 4. Thus, a reset signal applied from source 17 to windings 15 and 16 will tend to change the flux in both cores 1 and 2 in the same direction.

Figures 2, 3:
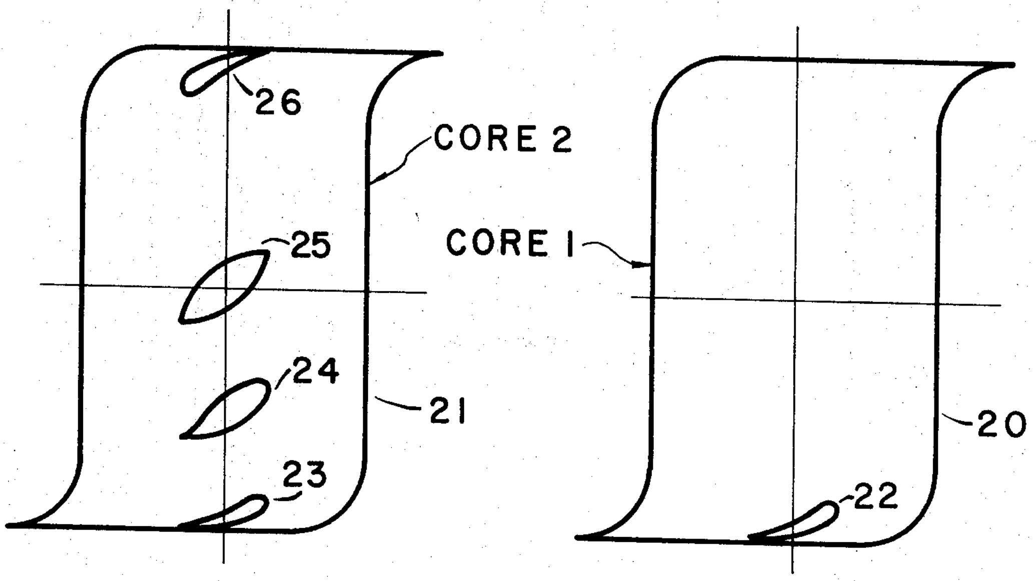
FIG. 2 is a B–H plot for the memorizing magnetic core.
FIG. 3 is a B–H plot for the reference core.

Referring to FIGS. 2 and 3, B–H curves are shown for cores 2 and 1, curve 20 illustrating the major loop of core 1 and curve 21 illustrating the major loop of core 2. The pulse signal from source 17 as applied to windings 15 and 16 is of sufficient amplitude to saturate both cores, illustratively in the negative direction. After the termination of the reset pulse, both cores settle to minor loop positions, position 22 for core 1 and position 23 for core 2. In this condition, inasmuch as cores 1 and 2 are similarly saturated, the output consequent from the A.C. excitation is zero, owing to the series-opposition connection of output windings 13 and 14.

The pulse reset establishes a more precisely repeatable reference zero if a bi-polar pulse is employed, the first portion of which brings both cores out of saturation, and the second portion of which, with the opposite polarity, tends to saturate both cores equally.

Upon application of an input analog signal to terminals 7 and 8, illustratively for the particular polarity of input wherein core 1 tends to increase its flux level, the minor loop of core 1 will remain at position 22; inasmuch as core 1 is already saturated with this polarity of input signal, core 2 will alter the position of its minor loop from 23 to position 24 as a consequence of the tendency to reduce the level of magnetic flux in core 2. Thereby, cores 1 and 2 become unbalanced, as evidence by the relative positions of minor lops 22 of core 1 and minor loop 24 of core 2.

The output signal applied to terminals 11 and 12 consits of fundamental and harmonic components. The fundamental output corresponding to the frequency of the A.C. excitation supplied to windings 3 and 4 becomes maximum as the minor loop of core 2 approaches position 25, the zero residual flux condition of core 2. This provides a maximum difference between the fundamental signal transferred to output winding 13 and output winding 14 as a consequence of a fully saturated core 1 and a fully de-magnetized core 2. A further positive-going change in the flux level of core 2 toward the opposite saturation condition (position 26) acts to reduce the fundamental output signal accordingly. When core 2 is saturated to minor loop position 26 as a consequence of the application of the input signal the fundamental component of the output again becomes zero, inasmuch as both cores are saturated.

With the flux condition in the cores starting from the reset reference level, the even harmonic output increases as the core 2 flux level decreases. A further displacement of the minor loop of core 2 from position 25 towards position 26 results in a further increase even harmonic output supplied to terminals 11 and 12, increasing to a maximum even harmonic output when minor loop position 26 is reached.

It should be noted that this method of reset may be effectuated by combining pulse source 17 in series with the A.C. excitation terminals 5 and 6, thereby utilizing the A.C. excitation windings 3 and 4 for both the function of pulse reset and A.C. excitation.

After application of a reset pulse, should the polarity of the input signal be opposite from that previously illustrated, that is a polarity tending to saturate core 2, core 1 as a consequence memorizes the analog signal causing the decrease flux level. This yields an output at terminals 11 and 12 having the opposite phase. It should be noted that if the input signal polarity reverses without an intervening reset pulse, the minor loops of the respective cores will both tend to displace. This action destroys the calibration of the original input signal. A remedy for this situation may be provided by the addition of a D.C. bias illustratively to winding 30 on core 1. This bias is adapted to keep core 1 saturated in the presence of an input signal otherwise tending to take core 1 out of saturation. Thereby, an input signal may be applied that will move the minor loop of core 2 from position 25 back up to saturation at position 23. That is, bi-polar input signals may be employed, so long as some analog value is retained such as may be subtracted from. The use of the D. C. bias for achieving analog subtraction restricts the output to a single phase, however, as compared to the phase sensitivity of the embodiment of FIG. 1 without the D.C. bias.

Figure 4:
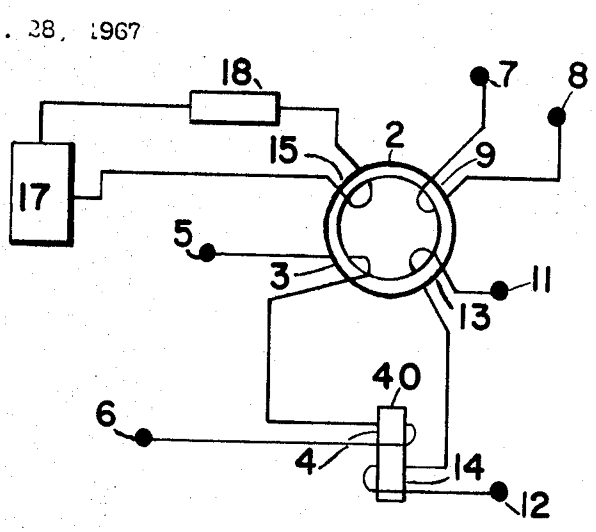
FIG. 4 is a schematic diagram of a reference linear inductor embodiment.

Alternatively, a bi-polar input signal may be handled by the circuit of FIG. 4, in which a linear inductor 40 is substituted for non-linear magnetic reference core 1. Linear inductor 40 performs the reference function by exhibiting a single reference permeability for balancing against the particular permeability exhibited by core 2, which in this configuration performs the memorizing function.

Linear inductor 40 has two windings, A.C. excitation winding 4 and output winding 14. The A.C. excitation is supplied to winding 3 on core 2 and to winding 4 on linear inductor 40 to thereby excite them in a mutual phase relationship. With this designation of the in-phase of relationship between core 2 and linear inductor 40, which is explained above is a matter of terminology, output winding 13 on core 2 and output winding 14 on linear inductor 40 are connected in a series opposition manner so that the A.C. excitation effectively cancels as appearing at output terminals 11 and 12. Core 2 is illustrated in FIG. 4 as also having an input winding 9 and a reset winding 15.

The behavious of core 2 in the circuit of FIG. 4 may be illustrated by referring to the B–H curve plotted in FIG. 2. Linear inductor 40 has its flux level change linearly with the application of magnetizing current, with the flux level conveniently being zero with no current applied. The circuit parameters, including the number of turns on the respective excitation windings 3 and 4 and output windings 13 and 14 are selected so that the A.C. excitation effectively cancels to a zero fundamental output when the core 2 is placed at saturation point 23 by the reset pulse. Presumably, there would not be any zero reset for a harmonic output signal, inasmuch as the magnetic characteristics of the core 2 and linear inductor 40 are dissimilar, and may not permit the balance of harmonic distortions thereof.

Input pulses of variable amplitude or duration may be applied to input terminals 7 and 8, which are connected to winding 9 on core 2. From the de-magnetized condition of core 2, represented by position 25 in FIG. 2, core 2 may have its flux levels raised to either position 23 or 26 according to the polarity of the input pulse. Of course , no signal will be memorized by linear inductor 40, which always retains its reference status. Once a particular flux level has been achieved by core 2, such as that represented by position 24, an input pulse of the opposite polarity may be impressed on winding 9 to thereby reduce the flux level proportionally towards the de-magnetized condition. That is, a bi-polar pulse input may be employed with the circuit of FIG. 4 to perform a subtracting function. If a larger analog value is subtracted from a smaller, the resultant memorized flux level will of course be of opposite polarity from that of the original analog value. Position 23 may they typify one polarity of flux level, while position 26 typifies the alternate polarity. Of course, the maximum resultant analog value that may be stored is limited by the displacement between position 23 and the de-magnetized condition 25, in the case when position 23 represents the reset state. For unambiguous readout, the flux polarity must always be the same at readout times.

The circuit of FIG. 4 may advantageously employ a bi-polar reset pulse, to more effectively determine a repeatable saturated condition of core 2 to balance against the inductance represented by linear inductor 40. That is, the reset condition of the circuit of FIG. 4 is more effectively that producing a zero output at output terminals 11 and 12, if each reset places core 2 at exactly the same saturated condition. The output windings 13 and 14, and A.C. excitation windings 3 and 4 may be wound so as to produce any level of output at terminals 11 and 12 representing the reset condition, but conveniently a zero fundamental output is suitable for most applications.

In the application of the circuit of FIG. 4, the input and output windings should be connected through high impedance to minimize circulating current caused by induced voltages, such as from the A.C. excitation source at terminals 5 and 6, or from pulse reset source 17.

Figure 5:
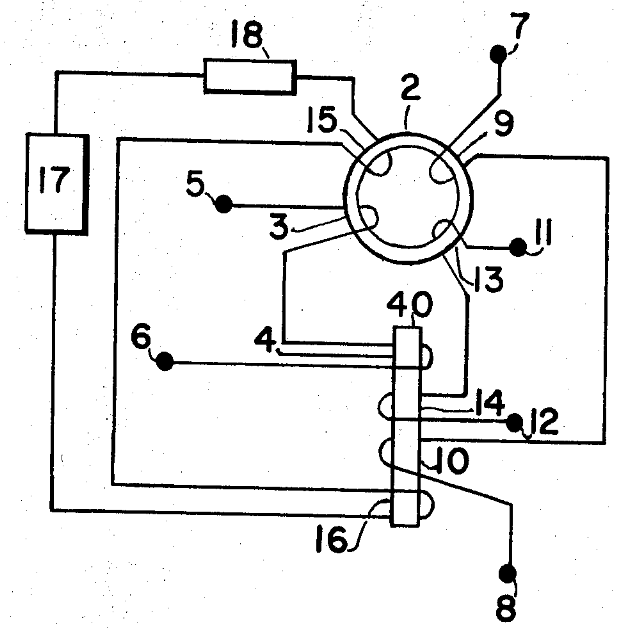
FIG. 5 is a schematic diagram of an alternate reference linear inductor embodiment.

Referring to FIG. 5, additional windings on linear inductor 40 may be employed to improve the operation thereof, according to the particular intended application. Input winding 10 may be added to linear inductor 40 to tend to cancel the induced voltage appearing at output terminals 11 and 12 consequent upon the A.C. excitation, thereby relaxing the requirement for a serial high impedance at input terminals 7 and 8.

In addition, or alternatively, an additional reset winding 16 may be associated with linear inductor 40, and it may be connected in a direction to tend to cancel the A.C. excitation coupled back to pulse source 17; this connection of reset winding 16 relaxes the requirements for a high impedance insertion at 18 serially with pulse reset source 17 and reset winding 15. Again, reset winding 16 may be connected in the other direction, so that the effect of the reset pulse would tend to cancel as appearing at output terminals 11 and 12. Thus it may be seen that various embodiments may be desirable according to the requirements of the particular application for which the analog memory is used.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A magnetic analog memory comprising, a pair of magnetic inductors each having a source of A.C. excitation supplied thereto and each having means for providing output signals therefrom produced by coupling of said excitation through respective said inductors with said means for providing output signals being interconnected in mutual phase opposition with respect to the mutual in-phase relationship of said A.C. excitation as respectively applied to said inductors so that a combined output signal may be obtained representing the difference between the respective output signals of each said inductor.

means to supply a reset pulse to at least one of said inductors, that inductor being a non-linear inductor, tending to saturate said non-linear inductor to a reference condition, and means to supply an input signal to at least said non-linear inductor, with said input signal being applied in a manner to bring said non-linear inductor out of its saturated reference condition toward its de-magnetized condition.

whereby the output of said non-linear inductor in its reference condition may be balanced against the output of the other inductor to produce a combined output signal representing the reset state of said magnetic analog memory.

2. The magnetic analog memory of claim 1, wherein one of said pair of magnetic inductors is a saturable non-linear inductor and the other inductor is a linear inductor.

3. The magnetic analog memory of claim 1 wherein said reset pulse is supplied to both of said pair of inductors.

4. The magnetic analog memory of claim 1 wherein said input signal is supplied to both of said pair of inductors mutually out of phase as compared with said mutual in-phase relationship of said A.C. excitation.

5. The magnetic analog memory of claim 1 wherein said reset pulse is supplied to both of said pair of inductors mutually in-phase and said input signal is supplied to both of said pair of inductors mutually out of phase as compared with said mutual in-phase relationship of said A.C. excitation.

6. The magnetic analog memory of claim 5 wherein both of said pair of inductors are non-linear inductors.

7. The magnetic analog memory of claim 5 wherein both of said pair of inductors are non-linear magnetic cores, the mutual in-phase application of said reset pulse tending to saturate both cores in the same mutual direction as determined by comparison with said mutual in-phase relationship of said A.C. excitation to respective reference conditions with the respective outputs of said cores in their reference conditions providing for a combined differenced output representing the reset state of said magnetic analog memory.

8. The magnetic analog memory of claim 7 where said combined output of said cores in their reference conditions produces substantially a zero level reset signal.

9. The magnetic analog memory of claim 1 wherein said reset pulse is bi-polar, having a first portion tending to bring at least a non-linear inductor out of its reference condition, and having a second portion of opposite polarity tending to saturate said non-linear idnuctor to its reference condition.

10. The magnetic analog memory of claim 7 wherein said reset pulse is bi-polar, having a first portion tending to change the flux level in both said cores in a direction away from the saturation reference condition of each, and said reset pulse having a second portion of opposite polarity to that of the first portion for saturating both said cores in the same mutual direction to thereby obtain a mutual saturated reference level condition producing an output signal representing the reset state of said magnetic analog memory.

11. The magnetic analog memory of claim 7 wherein A.C. excitation is supplied mutually in-phase to both said cores, with an output winding on each said core connected in mutual series opposition, with an input winding on each core connected in mutual series opposition, and with a reset winding on each core connected mutually in-phase, all with respect to the mutual in-phase relationship of said A.C. excitation, whereby input signals tend to change the flux level of each core in mutual opposing directions and reset pulses tend to change the flux level of each core in the same mutual direction.

12. The magnetic analog memory circuit of claim 7 with a D.C. bias supplied to a selected one of said cores having a sufficient magnitude to prevent an input signal pulse from de-saturating said selected core although said input signal pulse may be in a direction to tend to do so, whereby input pulses having a polarity tending to de-saturate said selected core perform a subtracting function from any analog value retained in the core alternate to said selected core.

13. The magnetic analog memory of claim 1 with the output adapted for sensing of the fundamental frequency of said A.C. excitation.

14. The magnetic analog memory of claim 1 with the output adapted for sensing of the harmonics of said A.C. excitation.

References Cited

Publication I: IEEE Transactions on Magnetics, vol. Mag–3 No. 3, September 1967; pp. 466–470.

JAMES W. MOFFITT, Primary Examiner

U.S. Cl. X.R.

307—88

UNITED STATES PATENT OFFICE
CERTIFICATE OF CORRECTION

Patent No. 3,534,342 Dated October 13, 1970

Inventor(s) Koosuke Harada

It is certified that error appears in the above-identified patent and that said Letters Patent are hereby corrected as shown below:

In the heading to the printed specification, lines 4 to 6 cancel "assignor to The Ohio State University Research Foundation, Columbus, Ohio".

Signed and sealed this 30th day of November 1971.

(SEAL)
Attest:

EDWARD M.FLETCHER,JR.
Attesting Officer

ROBERT GOTTSCHALK
Acting Commissioner of Patents

FORM PO-1050 (10-69)

USCOMM-DC 60376-P69
★ U.S. GOVERNMENT PRINTING OFFICE : 1969 O—366-334